Feb. 27, 1962 R. H. DAVIES ETAL 3,022,954
VARIABLE AREA VALVE
Filed Oct. 2, 1959 2 Sheets-Sheet 1

INVENTOR.
ROBERT H. DAVIES &
WILLIAM G. WEBSTER
BY
Oberlin, Maky & Donnelly
ATTORNEYS

INVENTOR.
ROBERT H. DAVIES &
WILLIAM G. WEBSTER

3,022,954
VARIABLE AREA VALVE

Robert H. Davies, Aurora, and William G. Webster, Lyndhurst, Ohio, assignors to Parker-Hannifin Corporation, Cleveland, Ohio, a corporation of Ohio
Filed Oct. 2, 1959, Ser. No. 844,065
8 Claims. (Cl. 239—453)

The present invention relates generally as indicated to a variable area valve for use either as a water or fuel injector in a gas turbine power plant or as a flow divider in conjunction with, for example, a dual-orifice fuel injection nozzle for such power plant.

Basically, fuel injectors or nozzles, as used in gas turbines, may be classified as the simplex, duplex, dual orifice, and spill types. In order that the features and advantages of the present variable area valve may be readily comprehended, these known nozzle types will now be generally described.

First of all, the simplex nozzle is a single orifice nozzle and is, of course, the simplest and least expensive of those enumerated above. However, the simplex nozzle has the disadvantage that it has a relatively narrow range of useful fuel flow (maximum to minimum) at which the mean droplet size is in the "fine mist" classification (less than about 150 microns) for efficient combustion. Following is a table of typical simplex nozzles and their characteristics assuming 500 p.s.i. as the maximum fuel pressure:

Table

| Nozzle size (lbs/hr at 100 p.s.i.) | Fuel flow for "fine mist" | |
|---|---|---|
| | Minimum | Maximum (lbs./hr. at 500 p.s.i.) |
| 25 | 9 lbs./hr. at 12 p.s.i. | 56      6:1 |
| 100 | 60 lbs./hr. at 36 p.s.i. | 240     4:1 |
| 300 | 280 lbs./hr. at 85 p.s.i. | 740    2.6:1 |

In the simplex nozzle the fixed orifice thereof is what meters the flow of fuel and therefore, such nozzle is subject to the square root law i.e. the rate of flow through the orifice is proportional to the square root of the applied fuel pressure, the fuel being admitted under pressure through tangentially directed swirl ports into a conical vortex chamber and acquiring an increasing whirl velocity as the diameter of the chamber decreases. The fuel is discharged from the orifice as a conical spray since it has both axial and tangential velocity components. The vortex chamber and orifice usually do not flow full, whereas there is an axial core of air or fuel vapor which persists in the base of the vortex chamber. At very low fuel pressures from zero to the minimums appearing in the table the fuel discharge from the orifice is first a dribble, then a twisted jet, and then, as the fuel pressure approaches the minimum, the jet opens out to form a tulip-shaped liquid sheet with some break-up into coarse drops which may be referred to as "rain." As the fuel pressure is increased above the minimum, the fuel issues from the orifice in the form of a conical spray consisting of a cloud of fine particles.

In order to substantially extend the useful fuel flow range, resort has been made to the much more complex nozzles such as the duplex, dual orifice, and spill types previously mentioned. In the duplex nozzle, the extended useful fuel flow range may be achieved as by providing a sliding piston which forms the large end of the vortex chamber and which moves back against a spring under increasing pressure to thereby increase the swirl port area. A disadvantage of the duplex nozzle is the necessity of extreme accurate machining of the components, the difficulty of accurately matching a set of nozzles, and the difficulty of maintaining adequate sensitivity of the nozzle during the cut-in period of the larger swirl ports, whereby the fuel flow may vary widely without a corresponding change in fuel pressure.

The so-called dual orifice nozzle is, in many respects, similar to that of the duplex nozzle and, as the name implies, there are usually provided two separate orifices in the dual orifice nozzle, whereby, at low pressures and low fuel flows, the fuel is discharged through a small or primary orifice whereas, at higher pressures and greater rates of fuel flow, fuel is discharged additionally through a larger or secondary orifice. While the dual orifice nozzle gives good atomization over a wide range of useful flow it requires careful design and matching of individual nozzles to avoid a sudden change in the pressure-flow characteristics. The cut-in point of the secondary orifice may be controlled as by check valves or by separate fuel manifolds. It has been proposed to employ specially designed flow dividers in an attempt to provide the desired sensitivity of flow to pressure throughout the useful flow range which may be as great as 100:1.

The spill type nozzle above-referred to has the advantage that it itself has no moving parts and is relatively easy to manufacture, the principle of operation thereof being that fuel is bled off the vortex chamber in varying amounts as controlled by a valve in the bleed line. Accordingly, a large amount of fuel at high pressure may be admitted into the vortex chamber to produce high whirl energy, but only a desired portion of this fuel is allowed to discharge through the nozzle orifice. The ideal condition of operation of this type of nozzle is that of constant inlet pressure with all control being effected by the spill valve, thus insuring constant high whirl velocity and hence fine atomization at all flows over a wide useful range. However, one chief disadvantage of the spill type nozzle is that a pump of relatively large capacity is required since the total flow, that is, the discharge plus the spill, may be several times that of the actual output required.

With the foregoing in mind, it is accordingly a principal object of this invention to provide a simple and efficient variable area valve which, when used as an injector, greatly extends the useful flow range as compared with that obtainable with a simplex nozzle, but without the disadvantages and high costs of the other known extended range nozzles such as the duplex, dual-orifice, and spill types.

It is another object of this invention to provide a variable area valve which, when installed as a flow divider for a dual-orifice nozzle or the like, modifies the usual pressure vs. flow curve of the secondary discharge orifice of the nozzle so as to achieve a desired extended range while retaining sensitivity of flow to change in pressure.

It is another object of this invention to provide a variable area valve which, when installed as an injector, has a relatively high useful flow range, for instance, 20:1, while yet having but a single discharge orifice.

It is another object of this invention to provide a variable area valve which is characterized in that the flow versus pressure curve thereof throughout the extended useful flow range, is nearly a straight line which has a moderate slope to provide the required sensitivity of flow to change in pressure.

It is another object of this invention to provide a variable area nozzle (injector or flow divider) which includes a spring-closed valve which at low pressures and low flows defines with the nozzle discharge orifice a variable area annular orifice which increases in flow area in approximately direct proportion to the pressure and which, after predetermined opening thereof, defines a relatively large capacity fixed annular orifice which is of such size in relation to the maximum flow and pressure as to be at the low, moderate slope range of the pressure-flow curve where pressure varies as the square of the flow or conversely where the flow varies as the square root of the pressure.

It is another object of this invention to provide a variable area nozzle (injector or flow divider) which has associated therewith a dashpot, or cushioning chamber, to smooth out the movements of the valve member and to prevent chattering or bouncing thereof due to elasticity of the nozzle parts or to fuel pressure waves, and pulsations or fluctuations.

It is another object of this invention to provide a variable area nozzle with which, when installed as an injector, good atomization is achieved throughout a wide range of useful fuel flow, with which the spray cone angle is substantially constant throughout the entire useful flow range, and with which the fuel flow may be accurately metered in accordance with fuel pressure.

It is another object of this invention to provide a variable area nozzle which, in conjunction with spin or swirl slots and with a vortex chamber upstream of the discharge orifice provides for good atomization through a wide range of fuel flow obtained through a relatively narrow range of fuel pressures, proper atomization at low flows and pressures being achieved by wire drawing effect of the orifice controlled by a spring actuated poppet or pintle valve, i.e. the valve face helps provide the restriction for producing atomization and desired spray pattern during the time that the energy of the fluid in the vortex chamber is relatively low; and proper atomization and spray pattern at progressively increasing pressures and flows being achieved by movement of the valve to gradually remove it as the determining factor in the atomization and spray pattern and to substitute the energy of the fluid in the vortex chamber as the fluid emerges from the orifice with high tangential and axial velocity components.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 2 is a cross-section view of the variable area valve herein adapted for use as a nozzle, specifically a water injection nozzle in which the usual swirl slots and vortex chamber employed in a fuel injection nozzle may be dispensed with;

Figure 1:
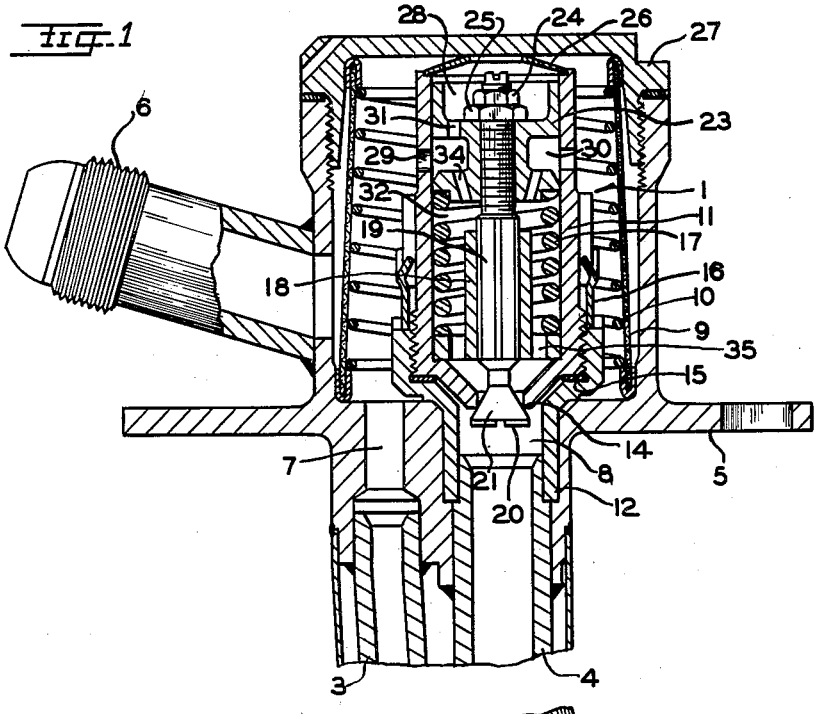
FIG. 1 is a central cross-section view of one form of the variable area valve constituting the present invention, the same being shown as a flow divider for a dual-orifice nozzle.

Referring now more particularly to the drawings, and first to the form of the invention illustrated in FIG. 1, the variable area valve therein shown is employed as a flow divider 1 in conjunction with a dual-orifice nozzle assembly 2. The dual-orifice nozzle 2 herein is provided with a central primary discharge orifice to which the conduit 3 leads, and with a secondary discharge orifice to which the conduit 4 leads. As well-known in the art, the secondary discharge orifice will have associated upstream thereof, a spin or vortex chamber and spin slots leading into the periphery of the vortex chamber, such spin slots generally being helically or tangentially arranged to impart to the fuel flowing therethrough a tangential velocity component. In this way, the fluid flowing through the spin slots into the vortex chamber has imparted thereto both axial and tangential velocity components so that, upon discharge through the secondary discharge orifice, the fluid will be broken up into finely divided particles and will be introduced into the combustion chamber of the turbine or like power plant as a conical spray.

The fuel inlet housing 5 for the flow divider 1 and nozzle assembly 2 is formed with a fuel inlet port 6 and with primary and secondary outlet ports 7 and 8 to which the respective conduits 3 and 4 are secured as by brazing, or other expedient. Inside the housing 5 and spaced from the wall thereof is a generally cylindrical filtering screen 9 which is supported against collapse as by the coil spring 10 therewithin.

It is to be noted that the inlet port 6 is in constant communication with the primary outlet port 7 and primary conduit 3, the primary orifice in nozzle 2 generally being of rather small size so that good atomization will be obtained at low fuel pressures and low flows. However, such small primary discharge orifice has an unduly limited useful flow range since, as appearing in the table, for example, in a 25 lbs./hr. nozzle (@ 100 p.s.i. fuel pressure), the pressure increases from say, 12 p.s.i. to 500 p.s.i. (a ratio of more than 40:1), while the flow only increases from 9 to 56 lbs./hr. (a ratio of about 6:1).

Accordingly, a dual-orifice nozzle provides a relatively large secondary orifice which is cut in at a prescribed pressure to extend the useful fuel flow range, so that, for example, with a pressure range of over 40:1 the flow ratio (the combined flow of the primary and secondary discharge orifices) may be say, 100:1, or more, as desired, with good atomization and proper spray pattern being obtained throughout the extended useful range. In the present case it is the function of the flow divider 1 to cut in the secondary discharge orifice at the proper time and to meter the fluid to the secondary discharge orifice at such a rate as to extend the flow range while yet maintain the necessary sensitivity of flow to change in fluid pressure.

The flow divider 1 herein comprises a body 11 which is screwed into a bushing 12 secured in the housing 5, the body 11 having a central opening forming a seat 14 which is coaxial with the central opening 8 in the bushing 12 and with the secondary conduit 4.

The body 11 engages a gasket 15 and is retained against inadvertent loosening as by means of the retainer 16 which, at its lower end, engages notches formed in the upper end of the bushing 12 and which, at its upper end, is formed with teeth engaged in axial grooves formed in the periphery of body 11.

Fitted in the body 11 and retained by the coil spring 17 is a valve guide and flow control member 18. Extending through the guide is the polygonal or fluted stem portion 19 of a poppet or pintle valve 20, which has tapered frusto-conical head 21 adapted to engage the seat 14 of the body 11. The upper end of the stem 19 is in threaded engagement with a spool-like member 23 which constitutes a combination dashpot and control orifice member against which the spring 17 bears to normally tend to urge the valve head 20 into engagement with the seat 14. The force with which the spring 17 thus bears on the valve 20 may be adjusted by turning the valve 20 with respect to the dashpot and flow control member 23 and locking it in adjusted positon as by means of lock nuts 24 and 2. Fitted into a counterbore at the upper end of the body 11 is a dished washer 26, or the like, which engages the cap 27 screwed into the housing 5, and thus serves to define a dashpot or cushioning chamber 28.

The body 11 is formed with lateral openings 29 therethrough to communicate the inlet port 6 with the pressure chamber 30, the pressure in chambers 30 and 28 being equalized by the orifice 31 which is of such size as to preclude chattering or bouncing movements of the valve 20 against the seat 14.

Figure 3:
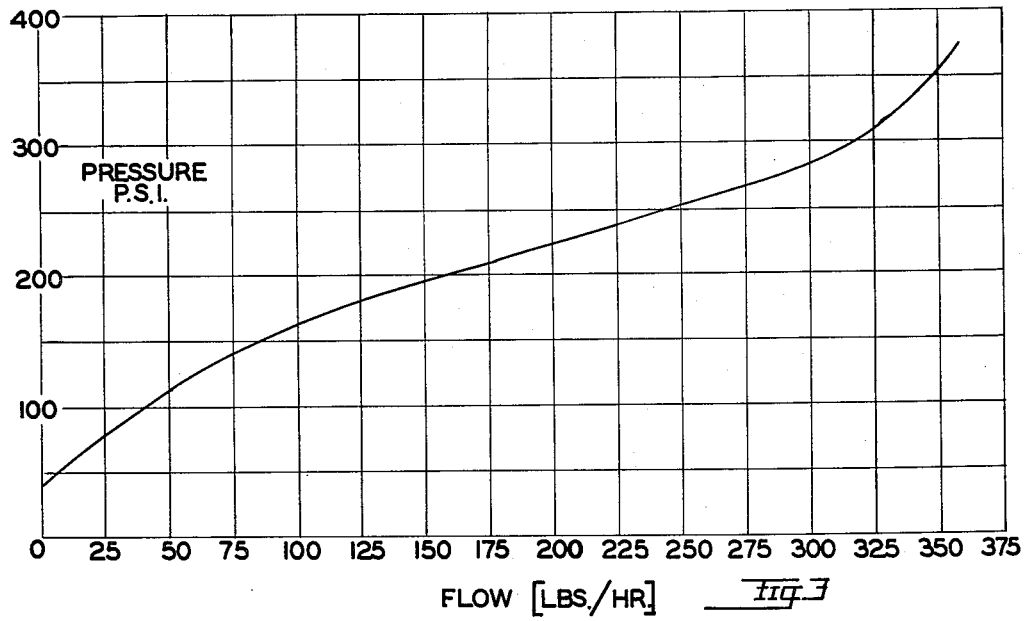
FIG. 3 is a typical flow versus pressure curve of the valve constituting the present invention whether used as an injector or as a flow divider.

The construction of the flow divider 1 is such that the valve 20 is held in closed position against seat 14 by the spring 17 until the fluid pressure in the housing 5 and in the chambers 28, 30, and 32 reaches a predetermined value. Until such predetermined pressure is reached, the fluid will flow from the inlet port 6 to the primary outlet port 7 and through the conduit 3 to the primary orifice of the nozzle 2, whereby efficient atomization of the fuel is achieved. Now, as the fluid pressure acting on the area of the valve seat 14 increases to a value sufficient to overcome the biasing effect of the spring 17, the valve 20 will be forced away from the seat 14, thereby permitting flow of fuel therepast via the chambers 30 and 32 to the outlet port 8 and through the conduit 4 which leads to the secondary orifice of the nozzle 2. A typical pressure versus flow curve is shown in FIG. 3 and, as apparent, the secondary flow will start at say, 40 p.s.i. and will increase say, only to about 20 lbs./hr., as the pressure increases from 40 to 75 p.s.i. During the initial opening movement of the valve 20, as aforesaid, the flow is substantially directly proportional to the pressure, the rate of spring 17 and the area of seat 14 being the controlling factors at this stage.

In the case that the structure of FIG. 1 is employed as a nozzle, the slight opening of the valve 20 due to relatively great change in pressure, results in good break-up of the fluid evidently because of the "wire drawing" effect as the fluid flows through the narrow annular gap between the conical head 21 and the seat 14.

Now, as the pressure increases, the increased flow and resulting increased pressure drop across the control orifices 34 between chambers 30 and 32 becomes the controlling influence with respect to continued metering characteristics of the valve 20. In other words, by reason of the differential flow capacities through the partly open valve 20 and of the control orifices 34 between chambers 30 and 32, produces an increasing pressure drop across the control orifices 34, whereby the then predominating pressure in the chambers 28 and 30 over that in the chamber 32, effects opening movement of the valve 20 at a greater rate in relation to each increment of pressure rise as evidenced by reduced slope of the pressure vs. flow curve FIG. 3. This pressure drop across control orifices 34 due to increased pressure and flow is represented by the portion of the curve between about 50 lbs./hr. flow and about 300 lbs./hr. flow while in the same interval, the pressure of the fluid has increased from about 115 to about 265 p.s.i. As apparent, the slope of the curve has been considerably flattened so that the flow range is about 6:1 while the pressure ratio was only about 2.3:1. After a flow of about 300–325 lbs./hr. and pressure of above about 275 p.s.i., the curve starts to follow the square root formula of the fixed orifices 34.

Accordingly, in the case of a flow divider 1, substantial fluid is supplied to the spin slots and spin chamber associated with the secondary orifice of nozzle 2, so that efficient atomization occurs and thereby extends the useful range of fuel flow.

From the typical curve of FIG. 3 it can be seen that the present invention provides an extended range while yet affording good sensitivity of flow with respect to change in pressure in view of the moderate slope of the curve. It is to be understood that by using springs 17 of different deflection rates; by employing different area ratios of the chambers 28, 30, and 32 to the area of seat 14; and/or by changing the size or number of control orifices 34, the curve may be variously modified. In fact, portions of the curve may be essentially horizontal, or may even have a downward dip therein.

A curve such as that shown in FIG. 3 may be achieved by employing a valve construction in which the chamber 28—30 area to seat 14 area has a ratio of about 2.6:1; in which there are four apertures of .043" diameter when the seat diameter is .187"; and in which the spring rate is about 300 lbs./in. It is, of course, to be understood that the initial opening or cracking pressure of the valve 20 may be changed to raise or lower the curve simply by varying the compression on the spring 17. Similarly, if it be desired to provide a greater sensitivity to flow relative to pressure change, the control orifices 34 are increased in number or size, whereby the pressure drop thereacross is decreased. By the same token, if it be desired to decrease the sensitivity, the flow capacity of the control orifices 34 is decreased whereby the pressure drop thereacross is increased.

The passages 35 in guide 18 and the passages between the valve stem 19 and the guide are of adequate flow capacity so as to accommodate full flow through the seat 14 without appreciable restriction.

Figure 2:
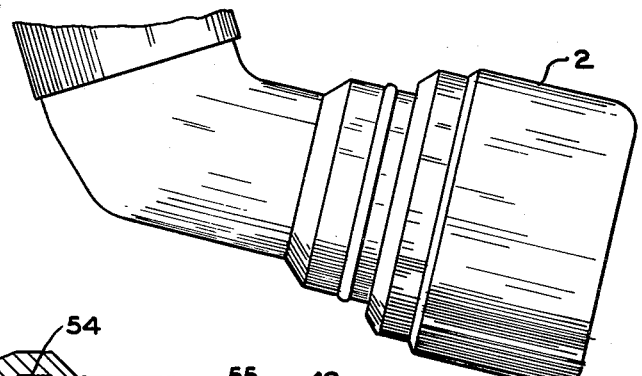
Figure 2:
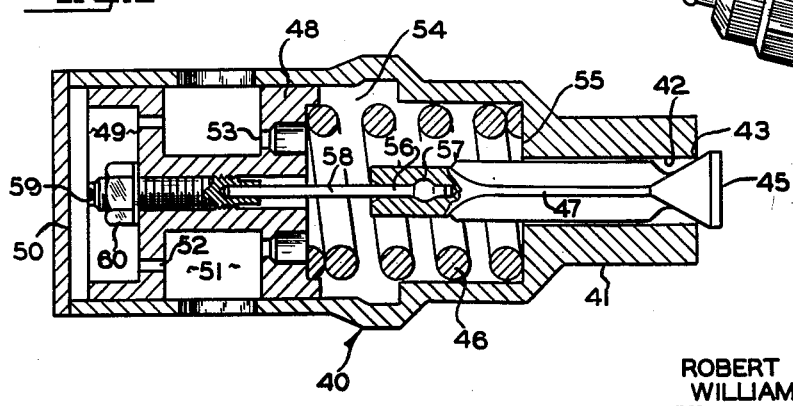

Referring now to FIG. 2, there is shown therein a water injection nozzle embodying the principles of this invention, hence, the usual spin slot and chamber have been dispensed with because fine atomization is not the principal requirement in connection with water injection as it is in connection with fuel injection. In this case, the variable area valve 40 comprises a body 41 formed with an exit bore 42 which defines a seat 43 against which the pintle or poppet type valve 45 is seated through pressure of the compression spring 46. The stem 47 of the valve 45 is longitudinally fluted, as shown, to provide a long guide therefor in the exit bore 2 and, of course, in the case of a fuel injection nozzle there will be provided instead of the longitudinal flutes, helical flutes or so-called "spin slots" which lead to a spin chamber just upstream of the valve seat 43.

Reciprocable axially in the body 41 is a spool-like member 48, one end of which forms a cushioning chamber 49 with the body 41 and end cap 50, said chamber 49 having communication with the inlet chamber 51 by way of the orifice 52. Extending through the other end of said spool-like member 48 are a set of control orifices 53 which lead into the chamber 54. The compression spring 46 bears on the spool-like member 48 and a shoulder 55 in the body 41.

The inner end of the valve 45 is formed with an axial bore 56 which is intersected by a transverse bore 57 and extending into the axial bore is one end of a wire 58 which is flattened in the region of the transverse bore 57 so as to secure the wire 58 in fixed axial position with respect to the valve 45, the other end of the wire 58 being brazed or otherwise secured into the adjusting screw 59 that has threaded engagement with the spool-like member 48. Thus, the wire is capable of flexing laterally to accommodate any misalignment of the spool member 48 with respect to the valve 45 while yet the valve and spool are secured together to move axially in unison. The adjusting screw 59 has threaded engagement with spool 48 and a locknut 60 is employed to lock the screw in adjusted position.

With the FIG. 2 construction, any desired discharge flow versus pressure curve may be achieved by selecting the area relationships between the chamber 49—51 and seat 43 and by varying the number or size of the control orifices 53. Here again, as in FIG. 1, the restricted communication of the cushioning chamber 49 with the inlet chamber 51 serves to cushion the movements of the entire valve assembly so that the head of valve 45 does not pound or bounce on its seat 43. It can be seen that at low pressures, the valve 45 will remain in engagement with seat 43 until the fluid pressure acting on the area of the seat 43 exceeds the opposing force exerted by the spring 46. When that fluid pressure is exceeded the spring 46 will yield to permit flow of fluid past the ever-widing annular gap between the valve 45 and the seat 43. During the initial period of opening of the valve 45, the pressures in the chambers 49—51 and 54 will be so nearly the same that the valve 45 will open in direct proportion to the pressure due to deflection of the spring 46. However, as the flow increases in response to increased pressure in the inlet chamber 51, there will be created a significant pressure drop across the control orifices 53 between the chambers 51 and 54 such that the predominating pressure in the chambers 49—51 will act on the cross-section area thereof and thereby continue to open the valve 45 at a greater rate than before, thereby making the major portion of the pressure vs. flow curve of moderate slope to provide sensitivity of flow to pressure and to provide an extended useful flow range.

Figure 4:
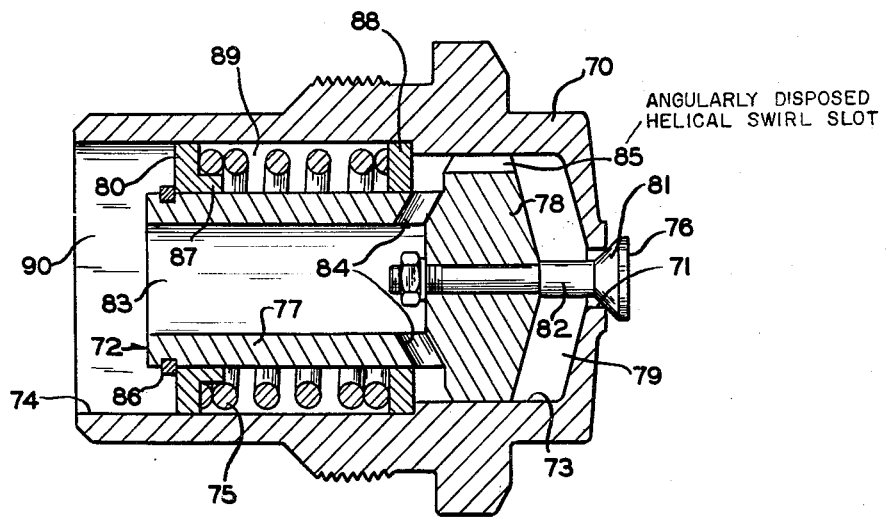
FIG. 4 is a cross-section view of a variable area valve designed for use as a fuel injection nozzle with spin slots and spin chamber and including a dashpot, or cushioning chamber to prevent chattering or bouncing of the nozzle valve member.

In general, the nozzle shown in FIG. 4, is quite similar to that of FIG. 2, and basically comprises three parts, viz, a nozzle body 70 formed with a discharge orifice 71, a valve and swirl port assembly 72, guided in coaxial counterbores 73 and 74, and a compression spring 75. The poppet or pintle type valve member 76 is secured to the valve guide 77 which has a helically slotted portion 78 guided in the bore 73 of the vortex chamber 79, and which has a guide ring 80 guided in the largest bore 74. Said valve member 76 includes a conical seat 81 and neck 82. In this case, when the fuel pressure exceeds the cracking pressure of the valve, the fuel will flow through the passage 83 of the guide 77, through the several openings 84 in the wall thereof, and then through the helically or angularly disposed swirl slots 85 into the vortex chamber 79.

In FIG. 4, the guide ring 80 is held on the guide member 77 as by means of a snap ring 86 and is provided with an axially extending flange 87 which serves to center the coil spring 75. The other end of the coil spring 75 bears against a guide ring 88 which is engaged with a shoulder in the nozzle body 70 and which has a close sliding fit with the counterbore 74 and with the exterior cylindrical surface of the guide member 77. Because of the close fits of the rings 80 and 88 with the counterbore 74 and with the guide member 77 there is defined between them a cushioning chamber or dashpot 89, which assures that the valve head 76 will move slowly and smoothly without chattering or bouncing. Often, in nozzles of the type wherein valve members are seated by springs, the cutting off of the fuel pressure will cause the valve member to rapidly engage its seat and this may set up pressure waves in the fuel pressure supply line which cause a bouncing or chattering of the valve against its seat with resulting after-dribble, aside from the detrimental effects that the pounding may have on the seating surfaces of the valve head and discharge orifice. Such bouncing may also be due in part to the elasticity of the nozzle parts. The dashpot or cushioning chamber 89 herein, and also the equivalent cushioning chambers in FIGS. 1 and 2, prevents the valve head from fluttering with respect to the discharge orifice in the event of pulsations or pressure fluctuations as the fuel or other fluid is being sprayed through the nozzle.

The control orifices in FIG. 4 are constituted by the helically or angularly disposed swirl slots 85 whereby, after initial cracking of the valve 76 due to the fluid pressure acting on the area of the discharge orifice 71 and fine metered spray due to "wire drawing" effect as already explained, the progressively increasing flow causes a progressive increase in pressure drop across the control orifices (the swirl slots 85) which acts on the area of the inlet chamber 90 to change the rate of continued opening of the valve 76. Of course, the increased flow through the slots 85 and vortex chamber 79 imparts high spin and axial velocity components to the fuel as it emerges from the discharge orifice 71 whereby good atomization is achieved throughout the useful extended flow range.

Other modes of applying the principle of the invention may be employed, change being made as regards the details described, provided the features stated in any of the following claims, or the equivalent of such, be employed.

We therefore particularly point out and distinctly claim as our invention:

1. A valve assembly comprising a body having a fluid inlet passage and a fluid outlet passage with a valve seat; a valve member axially reciprocable in said body out of and into engagement with said seat to open and close said outlet passage; spring means acting on said valve member to urge the latter into engagement with said seat; said valve member and body defining inlet and outlet chambers with relatively axially movable walls of substantially greater projected area than the area of said valve member which is exposed to fluid under pressure when in engagement with said seat; said chambers having fluid communication with each other via a control orifice of flow capacity such that during initial opening movement of said valve member away from said seat under the influence of fluid pressure acting on the aforesaid area thereof, the flow of fluid through said outlet passage increases in substantially direct proportion to the increase in fluid pressure and the pressures in said chambers are substantially equalized by said orifice as fluid flows therethrough and through said chambers from said inlet passage to said outlet passage, the flow capacity of said orifice further being such that as the fluid flow therethrough increases, with consequent increased pressure drop, the then predominant fluid pressure in said inlet chamber acting on the aforesaid projected area of the movable wall thereof effects continued opening movement of said valve and hence increased flow through the outlet passage but at a greater rate per unit of pressure increase than during such initial opening movement.

2. The valve assembly of claim 1 wherein said body and valve member define a cushioning chamber which has restricted communication with inlet chamber whereby to resist rapid movements of said valve member.

3. The valve assembly of claim 1 wherein said valve member has a lateral enlargement that constitutes a movable partition common to said inlet and outlet chambers, said orifice extending through said enlargement.

4. The valve assembly of claim 1 wherein said valve member has a spool-like lateral enlargement secured thereto of which one flange constitutes a movable partition common to said inlet and outlet chambers and of which the other flange defines with said body the movable wall of a cushioning chamber, said cushioning chamber having restricted communication with said inlet chamber whereby to resist rapid movements of said valve member.

5. A valve assembly comprising a body having an inlet port, an outlet port terminating in a circular valve seat, and a chamber laterally enlarged relative to said outlet port through which fluid is adapted to flow from said inlet port to said outlet port; a valve member axially reciprocable in said body to move into and out of engagement with said seat to thereby close and open said outlet port for flow of fluid therethrough; spring means acting on said valve member to urge the latter into engagement with said seat; said valve member having a laterally enlarged portion that subdivides said chamber into an inlet chamber in communication with said inlet port and an outlet chamber in communication with said outlet port; and said valve assembly having a control orifice communicating said inlet chamber with said outlet chamber; said control orifice being of flow capacity such that, following initial opening of said valve member by fluid pressure acting on the area of said seat and predetermined increase in flow through said outlet port per unit increase in pressure, the flow through said outlet port is substantially increased per unit increase in pressure owing to the predominance of fluid pressure in said inlet chamber as compared with the pressure in said outlet chamber.

6. The valve assembly of claim 5 wherein said control orifice extends through said laterally enlarged portion of said valve member.

7. The valve assembly of claim 5 wherein said valve member and body define a cushioning chamber that has restricted communication with said inlet chamber to impede rapid movements of said valve member.

8. The valve assembly of claim 5 wherein said control orifice is angularly disposed to impart whirling motion to the fluid as it flows into said outlet chamber, the area of said seat and the flow capacity of said orifice being such that, upon initial opening of said valve member, the pressure vs. flow curve is of relatively steep slope to meter the fluid through a narrow annular gap between said seat and said valve member to thus break up the fluid into a fine spray, and such that, upon further increase in fluid pressure, and hence increased flow, the pressure drop through said orifice effects widening of the gap at an increased rate for increased flow in relation to pressure increase whereby the fluid emerging from said gap is broken up into a fine spray due to the tangential and axial velocity components imparted thereto in said outlet chamber.

References Cited in the file of this patent

UNITED STATES PATENTS

| | | |
|---|---|---|
| 2,703,260 | Olson et al. | Mar. 1, 1955 |
| 2,893,647 | Wortman | July 7, 1959 |

FOREIGN PATENTS

| | | |
|---|---|---|
| 121,076 | Great Britain | Dec. 5, 1918 |
| 211,407 | Great Britain | Feb. 21, 1924 |
| 218,593 | Germany | June 23, 1909 |
| 1,006,471 | France | Jan. 20, 1952 |